United States Patent
Chang et al.

(10) Patent No.: US 8,746,905 B2
(45) Date of Patent: Jun. 10, 2014

(54) REFLECTING SHEET AND METHOD OF FABRICATING THE SAME

(75) Inventors: Su-Jin Chang, Daejeon (KR); Won-Taek Moon, Paju-si (KR); Sung-Hun Kim, Paju-si (KR); Sang-Hyun Lee, Paju-si (KR); Sang-Dae Han, Siheung-si (KR)

(73) Assignee: LG Display Co., Ltd., Seoul (KR)

( * ) Notice: Subject to any disclaimer, the term of this patent is extended or adjusted under 35 U.S.C. 154(b) by 329 days.

(21) Appl. No.: 13/220,973

(22) Filed: Aug. 30, 2011

(65) Prior Publication Data

US 2012/0050902 A1    Mar. 1, 2012

(30) Foreign Application Priority Data

Aug. 31, 2010    (KR) .................. 10-2010-0085161

(51) Int. Cl.
*G02B 5/08*    (2006.01)

(52) U.S. Cl.
USPC .......................................... 359/883; 359/359

(58) Field of Classification Search
USPC .......... 359/201.2, 208.1, 208.2, 212.1–213.1, 359/216.1, 219.2, 247, 267, 302, 359, 364, 359/459, 484.04, 514, 515, 530, 584, 589, 359/592, 833, 883
See application file for complete search history.

(56) References Cited

U.S. PATENT DOCUMENTS

| 2005/0002172 A1* | 1/2005 | Han et al. .................... 362/31 |
| 2010/0165472 A1* | 7/2010 | Hamasaki et al. ............ 359/627 |
| 2010/0165603 A1* | 7/2010 | Sun et al. ..................... 362/97.2 |
| 2011/0032629 A1* | 2/2011 | Brittingham et al. ......... 359/853 |

FOREIGN PATENT DOCUMENTS

| JP | 07281014 A | * 10/1995 | ............. G02B 5/128 |
| JP | 2004101693 A | * 4/2004 | ............. G02B 5/08 |
| JP | 2007045992 A | * 2/2007 | ............. G02B 5/08 |
| JP | 2010-152035 A | 7/2010 | |
| JP | 201 21 081 9 | * 6/2012 | ............. G02B 5/08 |
| KR | 1020060022136 | 3/2006 | |
| KR | 10-2009-0093867 A | 9/2009 | |
| TW | 200937043 | 9/2009 | |

OTHER PUBLICATIONS

Machine Translation of JP-2010-152035, downloaded from http://www4.ipdl.inpit.go.jp/Tokujitu/tjsogodbenk.ipdl on Sep. 19, 2013.*

* cited by examiner

*Primary Examiner* — Frank Font

(74) *Attorney, Agent, or Firm* — McKenna Long & Aldridge, LLP (57) ABSTRACT

A method of fabricating a reflecting sheet includes: providing a base sheet including a reflecting layer, an upper surface layer over the reflecting layer and a lower surface layer under the reflecting layer, the reflecting layer including a fine foam; dividing the base sheet into upper and lower division sheets; and forming a reinforcing layer on each of the upper and lower division sheets to constitute the reflecting sheet.

13 Claims, 5 Drawing Sheets

REFLECTING SHEET AND METHOD OF FABRICATING THE SAME

This application claims the benefit of Korean Patent Application No. 10-2010-0085161, filed on Aug. 31, 2010, which is hereby incorporated by reference in its entirety.

BACKGROUND OF THE INVENTION

1. Field of the Invention

The present invention relates to a reflecting sheet, and more particularly, to a reflecting sheet including a reinforcing layer of a backlight unit and a method of fabricating the reflecting sheet where a base sheet is divided into upper and lower division sheets and a reinforcing layer is formed on at least one of the upper and lower division sheets.

2. Discussion of the Related Art

As information age progresses, demand for display device displaying images has increased in various forms. Recently, various flat panel displays (FPDs) such as a liquid crystal display (LCD), a plasma display panel (PDP) and an organic light emitting diode (OLED) have been utilized. Among the various FPDs, a liquid crystal display (LCD) device has been widely used for a television or a monitor because of its advantages such as a small size, a light weight, a thin profile and a low power consumption. Since the LCD device is a non-emissive type display device, an additional light source is required. Accordingly, a backlight unit including a light source is disposed under the liquid crystal panel. The backlight unit may be classified into a direct type and an edge type according to a position of the light source.

In the direct type backlight unit, the light source is disposed under the liquid crystal panel and the light from the light source is directly supplied to the liquid crystal panel. In the edge type backlight unit, a light guide plate is disposed under the liquid crystal panel and the light source is disposed at a side of the light guide plate so that the light from the light source can be indirectly supplied to the liquid crystal panel using refraction and reflection in the light guide plate.

For the purpose of improving efficiency of light irradiated onto the liquid crystal panel, the edge type backlight unit includes a reflecting sheet that is disposed under the light guide plate to reflect the incident light from the light source.

Figure 1:
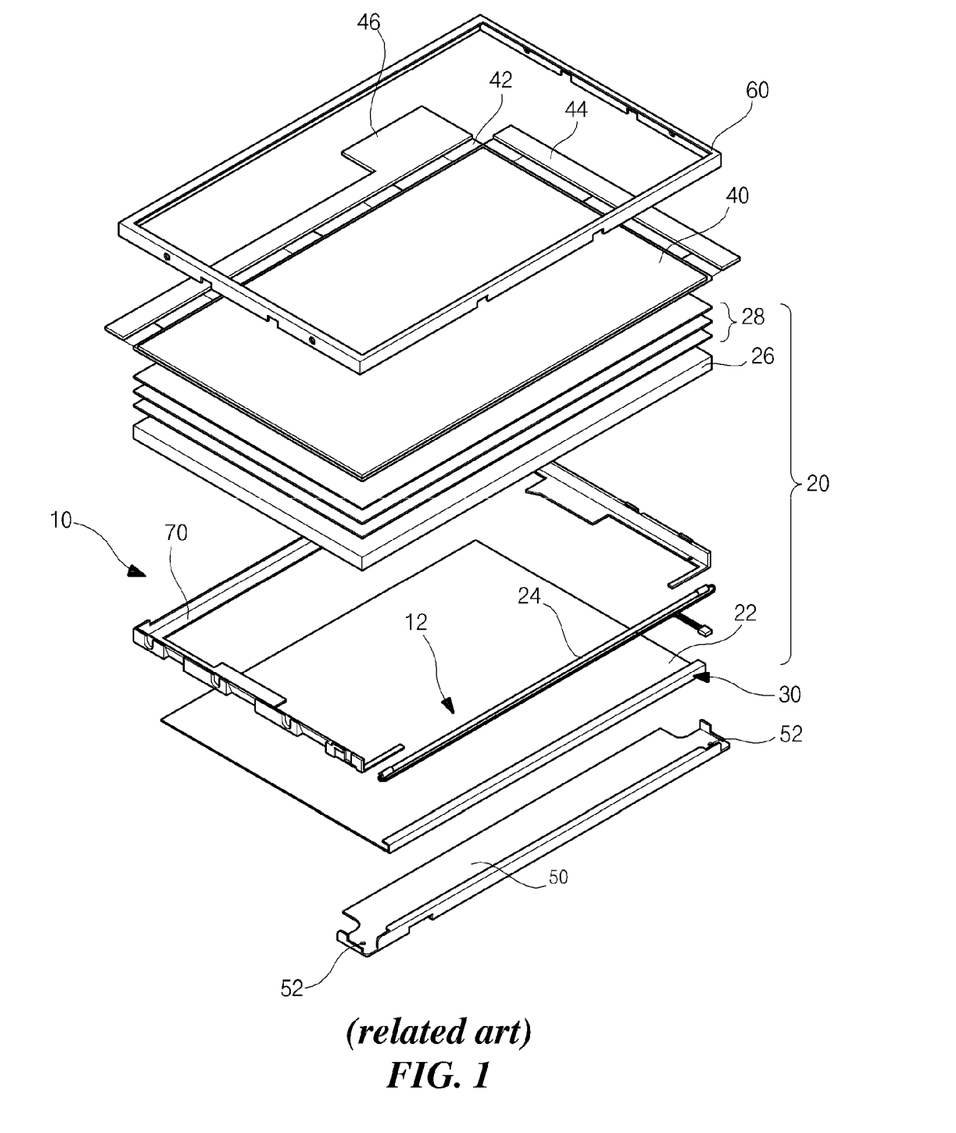
FIG. 1 is an exploded perspective view showing a liquid crystal display device including an edge type backlight unit according to the related art.

FIG. 1 is an exploded perspective view showing a liquid crystal display device including an edge type backlight unit according to the related art. In FIG. 1, a liquid crystal display (LCD) device 10 includes a liquid crystal panel 40, a backlight unit 20, a main frame 70, a top frame 60 and a bottom frame 50.

The liquid crystal panel 40 and the backlight unit 20 are integrated by the main frame 70, the top frame 60 and the bottom frame 50. The main frame 70 surrounds an edge portion of the liquid crystal panel 40 and the backlight unit 20. In addition, the top frame 60 covers a front edge portion of the liquid crystal panel 40 and the bottom frame 50 covers a rear surface of the backlight unit 20.

First and second printed circuit boards (PCBs) 44 and 46 are connected to the liquid crystal panel 40 through a flexible circuit board (FPC) 42. The first and second PCBs 44 and 46 may be bent toward a side surface of the main frame 70 or a rear surface of the bottom frame 50 during the integration of the liquid crystal panel 40 and the backlight unit 20 by the main frame 70, the top frame 60 and the bottom frame 50.

The backlight unit 20 disposed under the liquid crystal panel 40 includes a fluorescent lamp 24, a lamp housing 30, reflecting sheet 22, a light guide plate 26 and a plurality of optical sheets 28. The fluorescent lamp 24 as a light source is disposed along at least one side of the main frame 70 to face a side surface of the light guide plate 26 and the lamp housing 30 wraps the fluorescent lamp 24. The reflecting sheet 22 disposed over the bottom frame 50 is integrated with the lamp housing 30 as one body. In addition, the plurality of optical sheets 28 are disposed over the light guide plate 26.

In the backlight unit 20, the light emitted from the fluorescent lamp 24 enters the side surface of the light guide plate 26 and is refracted toward the liquid crystal panel 40. The light passing through the light guide plate 26 is diffused or collimated in the plurality of optical sheets 28 so that the light having a uniform brightness can be supplied to the liquid crystal panel 40. A side of the main frame 70 corresponding to the fluorescent lamp 24 and the lamp housing 30 may be removed such that the main frame 70 has an open shape. In addition, the plurality of optical sheets 28 may include a prism sheet and a diffusing sheet.

Figure 2:
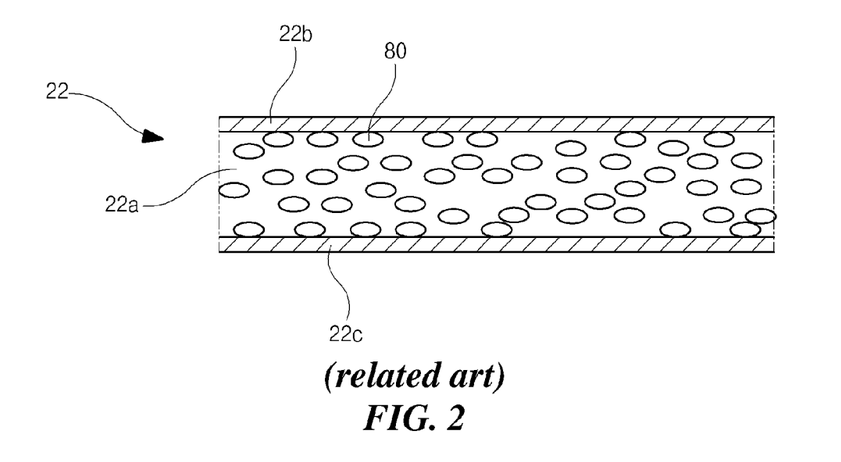
FIG. 2 is a cross-sectional view showing a reflecting sheet for a backlight unit according to the related art.

FIG. 2 is a cross-sectional view showing a reflecting sheet for a backlight unit according to the related art. In FIG. 2, the reflecting sheet 22 includes a reflecting layer 22a, an upper surface layer 22b and a lower surface layer 22c. The reflecting layer 22a reflects light and includes a fine foam 80. The upper and lower surface layers 22b and 22c are disposed over and under the reflecting layer 22a, respectively, and protect the reflecting layer 22a.

The light emitted from the fluorescent lamp 24 (of FIG. 1) is converted into a planar light by the light guide plate 26 (of FIG. 1) and the reflecting sheet 22 reflects the planar light toward the liquid crystal panel 40 using difference in refractive indices of the reflecting layer 22a and the air in the fine foam 80. The upper and lower surface layers 22b and 22c protecting the reflecting layer 22a do not include the fine foam 80.

Figure 3:
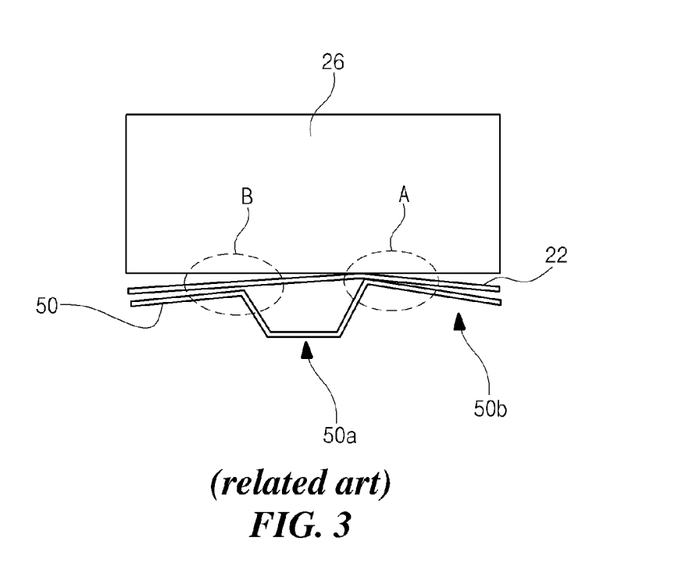
FIG. 3 is a cross-sectional view showing a backlight unit according to the related art.

FIG. 3 is a cross-sectional view showing a backlight unit according to the related art. In FIG. 3, the bottom frame 50 has a concave portion 50a and a flat portion 50b. The concave portion 50a may be formed in the bottom frame 50 to obtain a space for a wiring lines between the bottom frame 50 and the reflecting sheet 22 or a space for combining the bottom frame 50 and the main frame 70 (of FIG. 1). Since the concave portion 50a recedes from a flat portion 50b, a weight of the light guide plate 26 may be concentrated on a part of a boundary of the concave portion 50a when the light guide plate 26 is disposed over the bottom frame 50 with the reflecting sheet 22 interposed. For example, the weight of the light guide plate 26 may be concentrated on the part of the boundary of the concave portion 50a in a portion A. As a result, the boundary of the concave portion 50a of the reflecting sheet 22 may contact the light guide plate 26 and be pressed by the light guide plate 26 in the portion A, while the boundary of the concave portion 50a of the reflecting sheet 22 may be separated from the light guide plate 26 and not be pressed by the light guide plate 26 in a portion B.

Figure 4A:
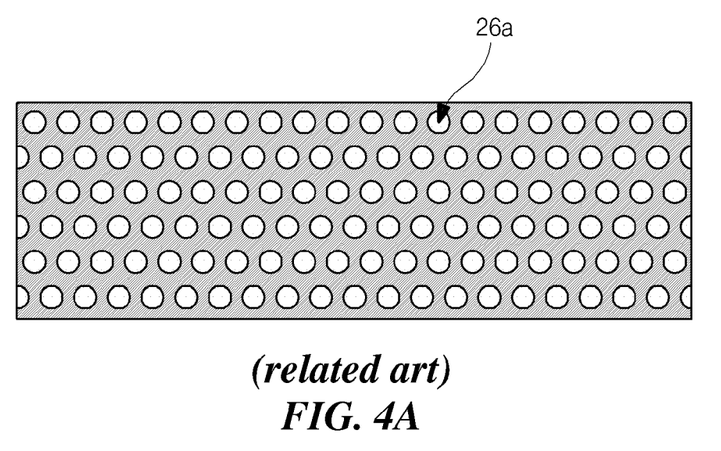
FIGS. 4A and 4B are plan views showing a light guide plate in portions A and B, respectively, of FIG. 3.
Figure 4B:
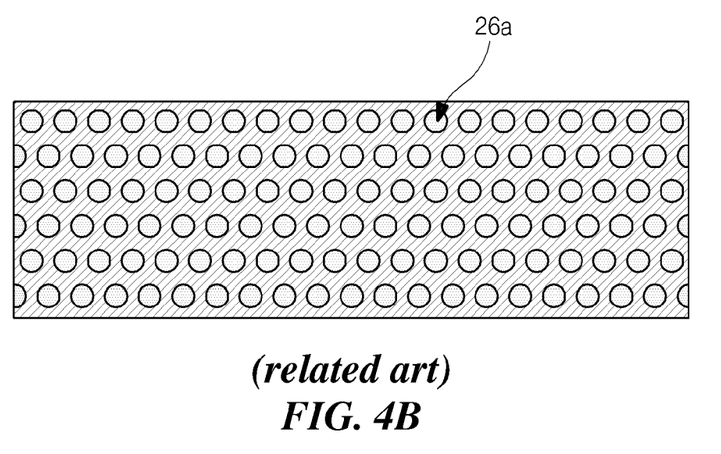

FIGS. 4A and 4B are plan views showing a light guide plate in portions A and B, respectively, of FIG. 3. FIGS. 4A and 4B show a surface of the light guide plate 26 (of FIG. 3) when the fluorescent lamp 24 (of FIG. 1) is turned on. In FIG. 4A, the weight of the light guide plate 26 is concentrated on the boundary of the concave portion 50a (of FIG. 3) of the reflecting sheet 22 and the reflecting sheet 26 is pressed by the light guide plate 26 in the portion A. In FIG. 4B, the reflecting sheet 26 is not pressed by the light guide plate 26.

The light guide plate 26 includes a plurality of uniformity patterns 26a on a rear surface thereof to improve uniformity of the planar light. When the reflecting sheet 26 is not pressed by the light guide plate 26 as in FIG. 4B, the plurality of uniformity patterns 26a may contact the reflecting sheet 22 and the light guide plate 26 between adjacent uniformity patterns 26a may not contact the reflecting sheet 22. As a result, the light from the reflecting sheet 22 is scattered at the plurality of uniformity patterns 26a toward a space between the adjacent uniformity patterns 26a so that the brightness uniformity of the light having passed through the light guide plate 26 can be improved. Accordingly, the brightness of the plurality of uniformity patterns 26a increases and the brightness between the adjacent uniformity patterns 26a decreases so that the difference in brightness can be reduced.

When the reflecting sheet 22 is pressed by the light guide plate 26 as in FIG. 4A, the reflecting sheet 22 may contact the light guide plate 26 between adjacent uniformity patterns 26a as well as the plurality of uniformity patterns 26a. As a result, the light reflected by the reflecting sheet 22 may not be scattered to the space between the adjacent uniformity patterns 26a and may be focused on the plurality of uniformity patterns 26a. Accordingly, the brightness of the plurality of uniformity patterns 26a increases and the brightness between the adjacent uniformity patterns 26a decreases. The difference in brightness of the light guide plate 26 causes deterioration of the LCD device such as an image stain.

In the LCD device according to the related art, since the weight of the light guide plate is concentrated on the boundary of the concave portion of the bottom frame, the reflecting sheet is partially adsorbed onto the light guide plate and deterioration such as an image stain is caused by the partially pressed contact.

Further, the reflecting sheet has been required to various fields such as an LCD device, a solar cell and a lighting device. However, since production yield by the method of fabricating the reflecting sheet according to the related art has a limit, an additional investment in equipment is required for increase of production.

SUMMARY OF THE INVENTION

Accordingly, the present invention is directed to a reflecting sheet and a method of fabricating the same that substantially obviate one or more of the problems due to limitations and disadvantages of the related art.

An advantage of the present invention is to provide a reflecting sheet and a method of fabricating the reflecting sheet where adsorption of the reflecting sheet and a light guide plate is prevented due to a reinforcing layer and deterioration in display quality is prevented.

Another advantage of the present invention is to provide a reflecting sheet and a method of fabricating the reflecting sheet where a base sheet is divided into upper and lower division sheets and each of the upper and lower division sheets is used for the reflecting sheet.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating a reflecting sheet includes: providing a base sheet including a reflecting layer, an upper surface layer over the reflecting layer and a lower surface layer under the reflecting layer, the reflecting layer including a fine foam; dividing the base sheet into upper and lower division sheets; and forming a reinforcing layer on each of the upper and lower division sheets to constitute the reflecting sheet.

In another aspect, a reflecting sheet includes: a reflecting layer including a fine foam, the reflecting layer having first and second surfaces opposite to each other; a surface layer on the second surface of the reflecting layer; and a reinforcing layer on at least one of the first surface and the surface layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, similar reference numbers will be used to refer to the same or similar parts.

Figure 5:
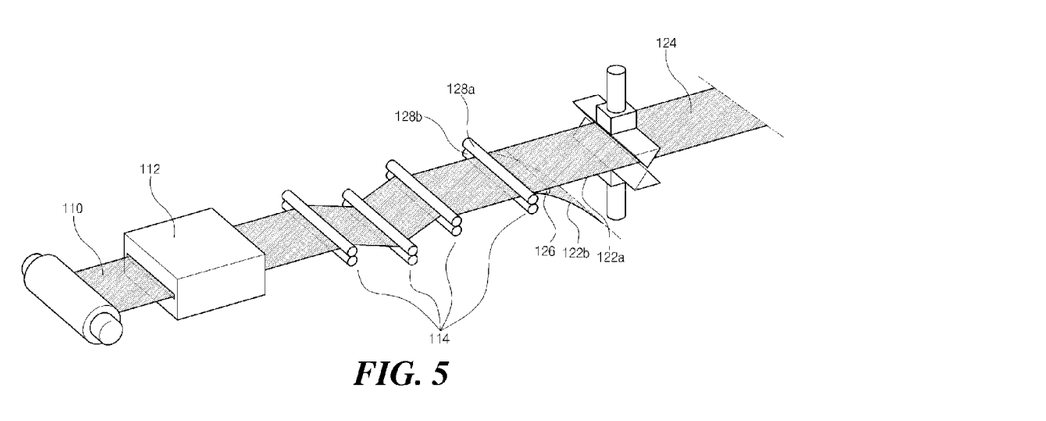
FIG. 5 is a perspective view showing a method of fabricating a reflecting sheet according to a first embodiment of the present invention.

FIG. 5 is a perspective view showing a method of fabricating a reflecting sheet according to a first embodiment of the present invention.

In FIG. 5, a base sheet 110 including a synthetic resin where a gas is injected is supplied to a heating apparatus 112. The base sheet 110 is heated at a predetermined temperature in a heating apparatus 112 such as an oven so that a fine foam (not shown) for scattering light can be formed in the base sheet 110. The base sheet 110 outputted from the heating apparatus 112 to a plurality of rolling means 114. The base sheet 110 is cooled and stretched to have a uniform thickness and a uniform flatness while passing through the plurality of rolling means 114. Each of the plurality of rolling means 114 may include upper and lower rollers 128a and 128b. While the base sheet 110 passes through the plurality of rolling means 114, the base sheet 110 is processed to have a uniform thickness and a uniform flatness.

After the base sheet 110 passes through the plurality of rolling means 114, the base sheet 110 is divided into upper and lower division sheets 122a and 122b by a knife 126 of a dieboard. Since the base sheet 110 is cut to have a reduced thickness, a first area of the base sheet 110 is the same as a second area of each of the upper and lower division sheets 122a and 122b. For example, the upper and lower division sheets 122a and 122b may have the same thickness as each other or may have the thicknesses different from each other.

After the base sheet 110 is divided into the upper and lower division sheets 122a and 122b, a reinforcing layer 140 (of FIG. 7) may be formed on at least one of first and second surfaces of each of the upper and lower division sheets 122a and 122b. Next, the reflecting sheet 124 is formed by cutting the upper and lower division sheets 122a and 122b to have an area for an LCD device, a solar cell and a lighting device.

Figure 6:
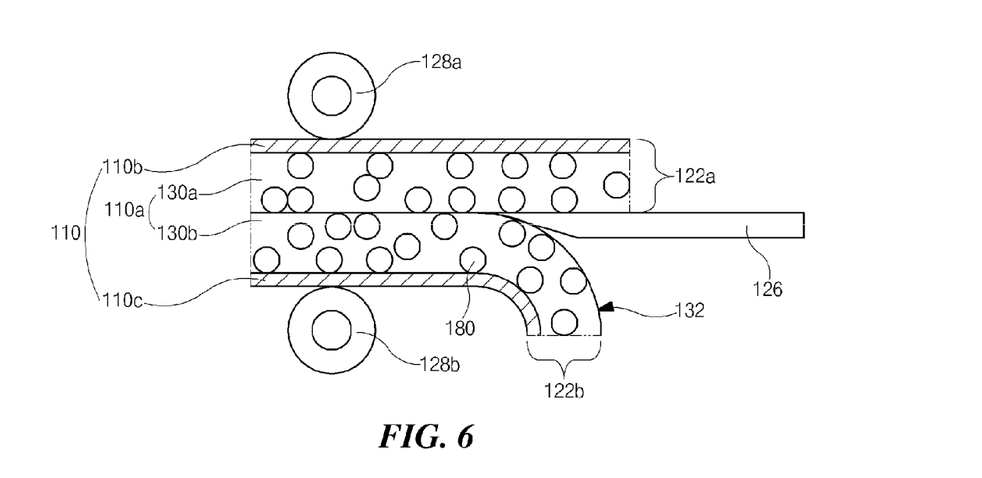
FIG. 6 is a cross-sectional view showing a step of dividing a base sheet of a method of fabricating a reflecting sheet according to a first embodiment of the present invention.

FIG. 6 is a cross-sectional view showing a step of dividing a base sheet of a method of fabricating a reflecting sheet according to a first embodiment of the present invention.

In FIG. 6, the base sheet 110 includes a reflecting layer 110a, an upper surface layer 110b and a lower surface layer 110c. The reflecting layer 110a reflects light and includes a fine foam 180 due to the injected gas. The upper and lower surface layers 110b and 110c are disposed over and under the reflecting layer 110a, respectively, and protect the reflecting layer 110a. The upper and lower surface layers 110b and 110c do not include the fine foam 180 because the injected gas is extracted. The upper and lower surface layers 110b and 110c may include the same material as the reflecting layer 110a. In another embodiment, the upper and lower surface layers 110b and 110c may include a material different from the reflecting layer 110a.

The base sheet 110 having passed through the upper and lower rollers 128a and 128b is divided into the upper and lower division sheets 122a and 122b by the knife 126 of a dieboard. The knife 126 may have a width greater than the base sheet 110 and may be disposed at a central portion of an end side surface of the base sheet 110. The base sheet 110 is continuously supplied by rotation of the upper and lower rollers 128a and 128b and is continuously divided into the upper and lower division sheets 122a and 122b by the knife 126. When the base sheet 110 is divided by the knife 126, the reflecting layer 110a of the base sheet 110 is divided into upper and lower reflecting layers 130a and 130b.

The upper division sheet 122a includes the upper surface layer 110b and the upper reflecting layer 130a and the lower division sheet 122b includes the lower surface layer 110c and the lower reflecting layer 130b. The upper and lower division sheets 122a and 122b may have the same thickness as each other or may have thicknesses different from each other. For example, when the base sheet 110 has a thickness of about 1 mm, each of the upper and lower division sheets 122a and 122b may have a thickness of about 0.5 mm. Alternatively, the upper and lower division sheets 122a and 122b may have thicknesses of about 0.6 mm and 0.4 mm, respectively. Accordingly, the thickness of each of the upper and lower division sheets 122a and 122b may be within a range of about 0.4 to about 0.6 of the thickness of the base sheet 110. The thickness ratio of the upper and lower division sheets 122a and 122b may be adjusted as necessary. Furthermore, at least one of the upper and lower division sheets 122a and 122b may be divided once more.

Figure 7:
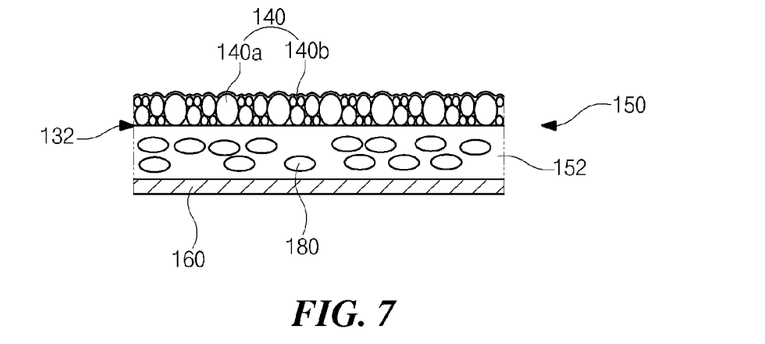
FIG. 7 is a cross-sectional view showing a reflecting sheet according to a first embodiment of the present invention.

FIG. 7 is a cross-sectional view showing a reflecting sheet according to a first embodiment of the present invention.

Since a division surface 132 of one of the upper and lower division sheets 122a and 122b (of FIG. 6) is not covered with a surface layer, the fine foam 180 may be damaged by an external impact or the division surface 132 may wrinkle by a heat from a light source. In addition, when a coating layer (not shown) is formed on one of the upper and lower surface layers 110b and 110c facing the division surface 132, the division surface 132 may wrinkle due to difference in thermal expansion coefficient between the coating layer and the reflecting layer 110a. As a result, when one of the upper and lower division sheets 122a and 122b is used as a reflecting sheet, the product adopting the reflecting sheet may be deteriorated.

In FIG. 7, a reflecting sheet 150 includes a reflecting layer 152, a surface layer 160 and a reinforcing layer 140. The reflecting layer 152 reflects light and includes a fine foam 180. The surface layer 160 is formed under the reflecting layer 152 and the reinforcing layer 140 is formed over the reflecting layer 152. The reinforcing layer 140 includes a bead 140a and a binder 140b for fixing the bead 140a to the reflecting layer 152. The reinforcing layer 140 may be formed on the division surface 132 by a coating method.

When the reflecting sheet 150 is applied to an LCD device, deterioration such as a damage of the fine foam 180, a wrinkle of the division surface 132, an adsorption of the reflecting sheet 150 and a light guide plate and an abrasion of the reflecting sheet 150 due to the light guide plate is prevented by the reinforcing layer 140.

The bead 140a may have a spherical shape and may include one of acrylic resin, polyurethane, polyvinyl chloride, polystyrene, polyacrylonitrile and polyamide. The bead 140a may be formed of a colorless transparent material so that the light can be transmitted between the light guide plate and the reflecting layer 152 and the reflecting layer 152 can reflect the light from the light guide plate.

The binder 140b may include a polymer such as acrylic resin, polyurethane, polyester, fluorine-based resin, silicon-based resin, polyamide and epoxy resin. Similarly to the bead 140a, the binder 140b may be formed of a colorless transparent material so that the light can be transmitted between the light guide plate and the reflecting layer 152 and the reflecting layer 152 can reflect the light from the light guide plate.

The reflecting sheet 150 that is formed by dividing the base sheet 110 into the upper and lower division sheets 122a and 122b and forming the reinforcing layer 140 on the division surface 132 is applied to an LCD device and a brightness of the LCD device is measured. Although a thickness of the reflecting sheet 150 is reduced and an additional surface layer is not formed between the reinforcing layer 140 and the reflecting layer 152, the brightness of the LCD device including the reflecting sheet 150 according to the first embodiment increases as compared with the brightness of the LCD device including the reflecting sheet according to the related art. Since the reflecting sheet 150 is formed by dividing the base sheet 110, the productivity of the reflecting sheet 150 is improved more than twice as compared with the productivity of the reflecting sheet according to the related art. In addition, since the reinforcing layer 140 is formed on the division surface 132 of one of the upper and lower division sheets 122a and 122b, deterioration such as a damage of the fine foam 180, a wrinkle of the division surface 132, an adsorption of the reflecting sheet 150 and a light guide plate and an abrasion of the reflecting sheet 150 due to the light guide plate is prevented and the light from the light guide plate is uniformly reflected by the reflecting sheet 150.

Figure 8:
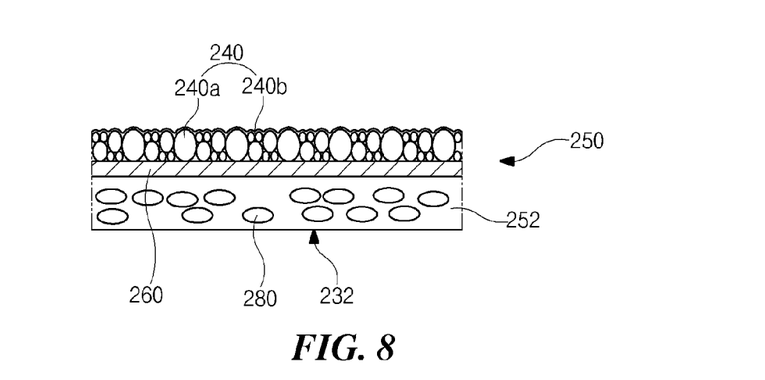
FIG. 8 is a cross-sectional view showing a reflecting sheet according to a second embodiment of the present invention.

FIG. 8 is a cross-sectional view showing a reflecting sheet according to a second embodiment of the present invention.

Since a division surface 232 of one of the upper and lower division sheets 122a and 122b (of FIG. 6) is not covered with a surface layer, a fine foam 280 may be damaged by an external impact or the division surface 232 may wrinkle by a heat from a light source.

In FIG. 8, for the purpose of preventing the above deterioration, a surface layer 260 is disposed to face a light guide plate and the division surface 232 is disposed to face a bottom frame in an LCD device. In addition, a reinforcing layer 240 is formed on the surface layer 260. As a result, the reflecting sheet 250 includes a reflecting layer 252, the surface layer 260 on the reflecting layer 252 and the reinforcing layer 240 on the surface layer 260. The reflecting layer 252 reflects light and includes a fine foam 280. The reinforcing layer 240 includes a bead 240a and a binder 240b for fixing the bead 240a to the surface layer 260. The reinforcing layer 240 may be formed on the surface layer 260 by a coating method.

When the reflecting sheet 250 is applied to an LCD device, deterioration such as a damage of the fine foam 280, a wrinkle of the surface layer 260, an adsorption of the reflecting sheet 250 and a light guide plate and an abrasion of the reflecting sheet 250 due to the light guide plate is prevented by the reinforcing layer 240.

The bead 240a may have a spherical shape and may include one of acrylic resin, polyurethane, polyvinyl chloride, polystyrene, polyacrylonitrile and polyamide. The bead 240a may be formed of a colorless transparent material so that the light can be transmitted between the light guide plate and the reflecting layer 252 and the reflecting layer 252 can reflect the light from the light guide plate.

The binder 240b may include a polymer such as acrylic resin, polyurethane, polyester, fluorine-based resin, silicon-based resin, polyamide and epoxy resin. Similarly to the bead 240a, the binder 240b may be formed of a colorless transparent material so that the light can be transmitted between the light guide plate and the reflecting layer 252 and the reflecting layer 252 can reflect the light from the light guide plate.

Figure 9:
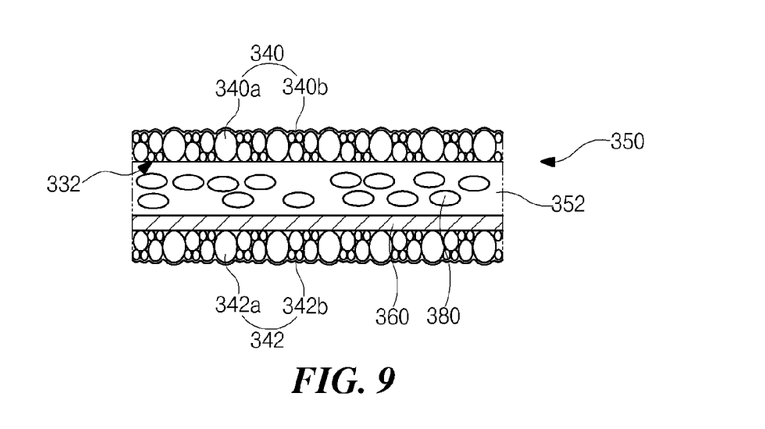
FIG. 9 is a cross-sectional view showing a reflecting sheet according to a third embodiment of the present invention.

FIG. 9 is a cross-sectional view showing a reflecting sheet according to a third embodiment of the present invention.

Since a division surface 332 of one of the upper and lower division sheets 122a and 122b (of FIG. 6) is not covered with a surface layer, a fine foam 380 may be damaged by an external impact or the division surface 332 may wrinkle by a heat from a light source when the division surface 332 is disposed to face a light guide plate. In addition, when a surface layer 360 is disposed to face the light guide plate, the surface layer 360 may wrinkle by a heat from a light source and the reflecting sheet 350 may be adsorbed or abraded by the light guide plate.

In FIG. 9, for the purpose of preventing the above deterioration, upper and lower reinforcing layers 340 and 342 are formed on the division surface 332 and the surface layer 360, respectively. As a result, the reflecting sheet 350 includes a reflecting layer 352, the upper reinforcing layer 340 on the reflecting layer 352, the surface layer 360 under the reflecting layer 3252 and the lower reinforcing layer 342 under the surface layer 360. The reflecting layer 352 reflects light and includes a fine foam 380. The upper reinforcing layer 340 includes a bead 340a and a binder 340b for fixing the bead 340a to the division surface 332 and the lower reinforcing layer 342 includes a bead 342a and a binder 342b fixing the bead 342a to the surface layer 360. The upper and lower reinforcing layers 340 and 342 may be formed on the division surface 332 and the surface layer 360, respectively, by a coating method.

When the reflecting sheet 350 is applied to an LCD device, deterioration such as a damage of the fine foam 380, a wrinkle of the surface layer 360, an adsorption of the reflecting sheet 350 and a light guide plate and an abrasion of the reflecting sheet 350 due to the light guide plate is prevented by the reinforcing layer 340.

The bead 340a may have a spherical shape and may include one of acrylic resin, polyurethane, polyvinyl chloride, polystyrene, polyacrylonitrile and polyamide. The bead 340a may be formed of a colorless transparent material so that the light can be transmitted between the light guide plate and the reflecting layer 352 and the reflecting layer 352 can reflect the light from the light guide plate.

The binder 340b may include a polymer such as acrylic resin, polyurethane, polyester, fluorine-based resin, silicon-based resin, polyamide and epoxy resin. Similarly to the bead 340a, the binder 340b may be formed of a colorless transparent material so that the light can be transmitted between the light guide plate and the reflecting layer 352 and the reflecting layer 352 can reflect the light from the light guide plate.

In an LCD device according to the present invention, consequently, since a base sheet is divided into upper and lower division sheets and each of the upper and lower division sheets is used for a reflecting sheet. As a result, the productivity of the reflecting sheet is improved more than twice as compared with the productivity of the reflecting sheet according to the related art. In addition, since a reinforcing layer is formed on at least one of a division surface and a surface layer of each of the upper and lower division sheets, deterioration such as a damage of the fine foam, a wrinkle of the division surface, an adsorption of the reflecting sheet and a light guide plate and an abrasion of the reflecting sheet due to the light guide plate is prevented and the light from the light guide plate is uniformly reflected by the reflecting sheet.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A reflecting sheet, comprising:
   a reflecting layer including a foam, the reflecting layer having first and second surfaces opposite to each other;
   a surface layer on the second surface of the reflecting layer; and
   a reinforcing layer on the first surface of the reflecting layer.

2. A method of fabricating a reflecting sheet, comprising:
   providing a base sheet including a reflecting layer, an upper surface layer over the reflecting layer and a lower surface layer under the reflecting layer, the reflecting layer including a foam;
   dividing the base sheet into upper and lower division sheets; and
   forming a reinforcing layer on the upper and lower division sheets opposite to the upper and lower surface layers to constitute the reflecting sheet.

3. The method according to claim 2, wherein a first plane area of the base sheet before the step of dividing is the same as a second plane area of each of the upper and lower division sheets after the step of dividing.

4. The method according to claim 2, wherein a knife of a dieboard is disposed at a central portion of an end side surface of the base sheet and the base sheet is continuously divided into the upper and lower division sheets by the knife.

5. The method according to claim 2, further comprising cutting each of the upper and lower division sheets to form the reflecting sheet.

6. The method according to claim 2, wherein the reflecting layer of the base sheet is divided into upper and lower reflecting layers, and wherein the upper surface layer and the upper reflecting layer constitute the upper division sheet and the lower surface layer and the lower reflecting layer constitute the lower division sheet.

7. The method according to claim 2, wherein the reinforcing layer is formed on the upper surface layer of the upper division sheet and is formed on the lower surface layer of the lower division sheet.

8. The method according to claim 2, wherein each of the upper and lower surface layers has a same material as the reflecting layer.

9. The method according to claim 2, wherein each of the upper and lower surface layers has a different material from the reflecting layer.

10. The method according to claim 2, wherein the reinforcing layer is formed by a coating method.

11. The method according to claim 2, wherein a thickness of each of the upper and lower division sheets is within a range of about 0.4 to about 0.6 of a thickness of the base sheet.

12. The reflecting sheet according to claim 11, wherein the reinforcing layer includes a bead and a binder for fixing the bead.

13. The reflecting sheet according to claim 12, wherein each of the bead and the binder includes a colorless transparent material.

* * * * *